United States Patent
Seidl et al.

(10) Patent No.: US 10,578,353 B2
(45) Date of Patent: Mar. 3, 2020

(54) AUTONOMOUS SEAL MONITORING FOR A REFRIGERATION UNIT

(71) Applicant: TEXAS INSTRUMENTS INCORPORATED, Dallas, TX (US)

(72) Inventors: Michael Seidl, Freising (DE); Bjoern Oliver Eversmann, Palzing (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 15/809,692

(22) Filed: Nov. 10, 2017

(65) Prior Publication Data

US 2019/0145702 A1    May 16, 2019

(51) Int. Cl.
| | |
|---|---|
| *F25D 29/00* | (2006.01) |
| *G01M 3/00* | (2006.01) |
| *F25D 23/02* | (2006.01) |
| *G01M 3/32* | (2006.01) |

(52) U.S. Cl.
CPC ......... *F25D 29/008* (2013.01); *F25D 23/028* (2013.01); *G01M 3/002* (2013.01); *G01M 3/3236* (2013.01); *F25D 2700/02* (2013.01); *F25D 2700/12* (2013.01)

(58) Field of Classification Search
CPC .... G01M 3/002; G01M 3/186; G01M 3/3236; G01M 3/3263; G01M 3/3281; G01M 3/329; F25D 2700/00; F25D 2700/02; F25D 2700/12; F25D 27/00; F25D 27/02; F25D 27/12; F25D 29/008
See application file for complete search history.

(56) References Cited

U.S. PATENT DOCUMENTS

| | | | | |
|---|---|---|---|---|
| 2009/0093917 A1* | 4/2009 | Smith | ................... | F25B 49/005 700/300 |
| 2011/0060547 A1* | 3/2011 | Foucher | ................ | G01M 3/186 702/138 |
| 2014/0230525 A1* | 8/2014 | Willemin | .............. | G01M 3/002 73/49.3 |
| 2019/0041291 A1* | 2/2019 | Bialik | ..................... | G01M 3/02 |

FOREIGN PATENT DOCUMENTS

WO    WO-0163190 A1 *   8/2001    ............. F25D 29/00

OTHER PUBLICATIONS

LPA Wireless Website. Retrieved from www.lpawireless.com/products and www.lpawireless.com/about-us as of Oct. 2016 using the Wayback Machine. (Year: 2016).*

* cited by examiner

*Primary Examiner* — Nathaniel J Kolb
(74) *Attorney, Agent, or Firm* — John R. Pessetto; Charles A. Brill; Frank D. Cimino

(57) ABSTRACT

An apparatus includes a temperature sensor, a pressure sensor, a communication interface, and a hardware controller. The hardware controller may detect a door open and close event for a refrigeration unit and receives temperature readings from the temperature sensor and pressure readings from the pressure sensor. The hardware controller determines whether a performance level of the seal has fallen below a threshold level based on the temperature and pressure readings and transmits a signal through the communication interface responsive to a determination that the performance level of the seal has fallen below the threshold level.

19 Claims, 3 Drawing Sheets

AUTONOMOUS SEAL MONITORING FOR A REFRIGERATION UNIT

BACKGROUND

There has been an increased focus on energy conservation in recent years. Many computers have lower power modes of operation to save power when the computer is otherwise not being used. Even consumer appliances and other equipment are being engineered to save power. Air conditioning systems and hot water heaters are generally more energy efficient now than they were 20 years ago.

SUMMARY

In one embodiment, an apparatus for a refrigeration unit includes a temperature sensor, a pressure sensor, a communication interface, and a hardware controller. The hardware controller monitors temperature readings from the temperature sensor and pressure readings from the pressure sensor. The hardware controller determines whether a performance level of a seal of the refrigeration unit has fallen below a threshold level based on the temperature and pressure readings and transmits a signal through the communication interface responsive to a determination that the performance level of the seal has fallen below the threshold level.

In another embodiment, an apparatus includes an air chilling component to chill air inside a chassis. The chassis has a hingeably connected door and a seal disposed around an interface between the chassis and the door. The apparatus further includes a temperature sensor inside the chassis, a pressure sensor also inside the chassis, and a hardware controller. The hardware controller is configured to receive temperature readings from the temperature sensor and pressure readings from the pressure sensor; and to determine whether a performance level of the seal has fallen below a threshold level based on the temperature and pressure readings.

In yet another embodiment, a method includes monitoring pressure readings from a pressure sensor in a refrigeration unit, monitoring temperature readings from a temperature sensor in the refrigeration unit, detecting that a door of the refrigeration unit has been opened and then closed, and determining whether a seal disposed about an interface of the door to a chassis of the refrigeration unit has failed based on the monitored pressure and temperature readings. Further, the method includes, responsive to a determination that the seal has failed, transmitting a signal through a wireless interface to indicate the failure.

BRIEF DESCRIPTION OF THE DRAWINGS

For a detailed description of various examples, reference will now be made to the accompanying drawings in which.

DETAILED DESCRIPTION

Figure 1:
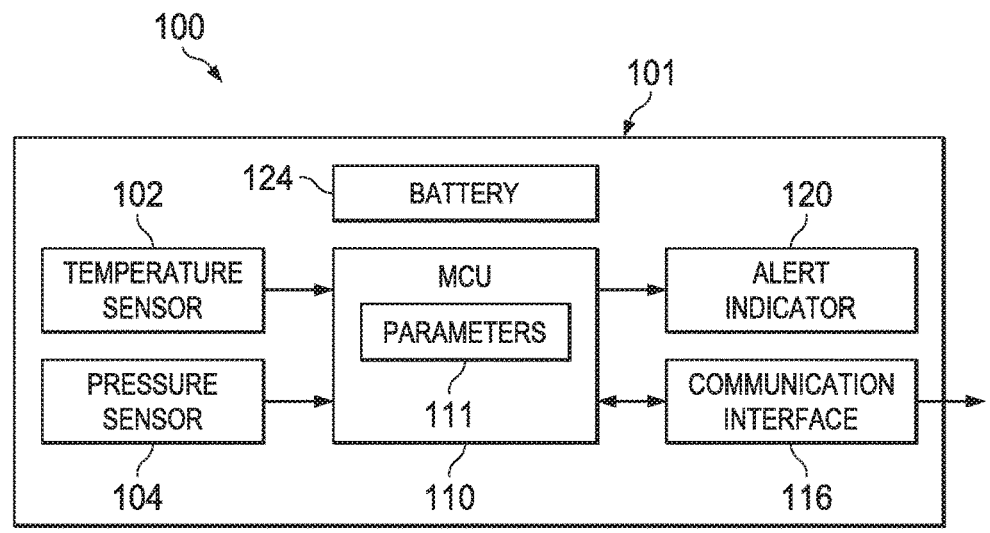
FIG. 1 illustrates an embodiment of a refrigeration seal monitor.

A refrigeration unit generally includes a chassis in which items to be chilled are placed. A door is hingeably attached to the chassis and can be open and shut to access the contents of the chassis. Each time that the door is opened, warm ambient air rushes into the chassis. The chilling component of the refrigeration unit (e.g., a compressor) turns on to chill the air. The chassis is generally well-insulated and a seal is disposed around the interface between the chassis and the door. The door engages the seal to prevent warmer ambient air from leaking into the cooler chassis. Over time, however, the seal may begin to degrade. A degraded seal may permit warm air to pass through into the chassis thereby causing the chilling component to operate for longer periods of time than when the seal was not degraded. Because the operational time of the chilling component increases, the energy cost for the refrigeration unit also increases. A degraded seal also may cause the humidity level inside the refrigeration unit to increase which may lead to ice formation which may further degrade the performance of the unit.

The embodiments disclosed herein are directed to an autonomous seal monitoring apparatus. The apparatus includes pressure and temperature sensors coupled to a microcontroller unit. When the door of the refrigeration unit is opened, warm air rushes in to the chassis. As the door is then closed, the air inside the chassis begins to cool down. As the air temperature drops, so does the air pressure (at least temporarily) within the chassis. If the seal is defective, additional air molecules pass through the seal into the chassis even when the door is shut. As a result of the additional influx of air molecules, the pressure in a refrigeration unit with a defective seal does not drop as much as for a comparable refrigeration unit with a good seal. The microcontroller unit processes the pressure and temperature readings from the sensors and determines whether the performance level of the seal has fallen below a threshold level.

In one embodiment, the microcontroller detects a door open and then close event for the refrigeration unit. Then, responsive to the door open/close event, the microcontroller unit monitors temperature readings from the temperature sensor and pressure readings from the pressure sensor and determines whether the performance level of the seal has fallen below a threshold level based on the temperature and pressure readings. If the seal is determined to be degraded, the microcontroller unit transmits a signal through the communication interface responsive to a determination that the performance level of the seal has fallen below the threshold level. The signal may be received on mobile device (e.g., a smart phone) to alert the appropriate person that the refrigeration unit may have a bad seal. The seal then can be examined and, if necessary fixed or replaced. Alternatively, the microcontroller may transmit the actual readings to another controller or device internal or external to the refrigeration unit to allow further data processing and remedial operations (e.g., transmission of an alert, etc.). In some embodiments, the microcontroller may monitor the temperature and pressure readings to determine if the seal has degraded without first detecting a door open and close event.

The term "refrigeration unit" refers to any type of unit that has a compartment in which a gas (e.g., air) is chilled. Refrigeration units may include home refrigerators, combination refrigerator-freezers, freezers, wine coolers, industrial cooling units, etc.

FIG. 1 shows an embodiment of a refrigeration seal monitor 100. In this example, the refrigeration seal monitor 100 is provided as a battery-operated apparatus containing various components in a unitary package 101. That is, the embodiment of FIG. 1 can be manufactured and/or sold separate from the refrigeration unit and then placed into any refrigeration unit. In the example of FIG. 1, the refrigeration seal monitor 100 can be placed on a shelf or elsewhere within the refrigeration unit.

The refrigeration seal monitor 100 of the example of FIG. 1 includes a temperature sensor 102, a pressure sensor 104, a microcontroller unit (MCU) 110, a communication interface 106, an alert indicator 120, and a battery 124 (or other power source (e.g., power harvesting device, connection to an external power supply, etc.). The MCU 110 may comprise any suitable type of hardware controller such as a microprocessor, microcontroller, finite state machine, programmable logic device, etc. In one embodiment, the MCU may contain, or be coupled to, solid state storage (e.g., memory) which contains executable instructions. When the instructions are executed, the MCU 110 performs some or all of the functionality described herein. The MCU 110 may have memory that can be used to store one or more parameters 111 usable to determine if a seal has degraded as explained below. Alternatively, the parameters 111 are stored separate from, but accessible to, the MCU.

The temperature sensor 102 may comprise a thermistor (e.g., a negative temperature coefficient thermistor), a resistance temperature detector (RTD), a thermocouple, or a semiconductor-based temperature sensor (e.g., diodes). Other types of temperature sensors are also possible.

The pressure sensor 104 may comprise a piezoresistive strain gauge, a piezoelectric sensor, a capacitive pressure sensor, an electromagnetic pressure sensor, an optical sensor, resonant sensors, etc. Other types of pressure sensors are also possible.

The communication interface 116 may comprise a wireless interface such as WiFi, Bluetooth, Near Field Communication (NFC), a wired interface, etc. In one scenario, the communication interface has WiFi capability and wirelessly couples to the wireless network in the structure (home, building, etc.) in which the refrigeration unit whose seal is being monitored by the refrigeration seal monitor 100 is located. Any signals transmitted by the communication interface 116 may be relayed to the user's mobile device or to any other network device through the wireless network and other local and wide area networks.

The alert indicator 120 may comprise a visual indicator such as a light emitting diode (LED), an audible indicator, a combination of a visual and audible indicator, or other types of indication to provide feedback status to a user. When the MCU 110 determines that the refrigeration unit's seal has been compromised, the MCU 110 can send a signal to the alert indicator 120 to cause the alert indicator to provide a feedback indication to a user.

Figure 2:
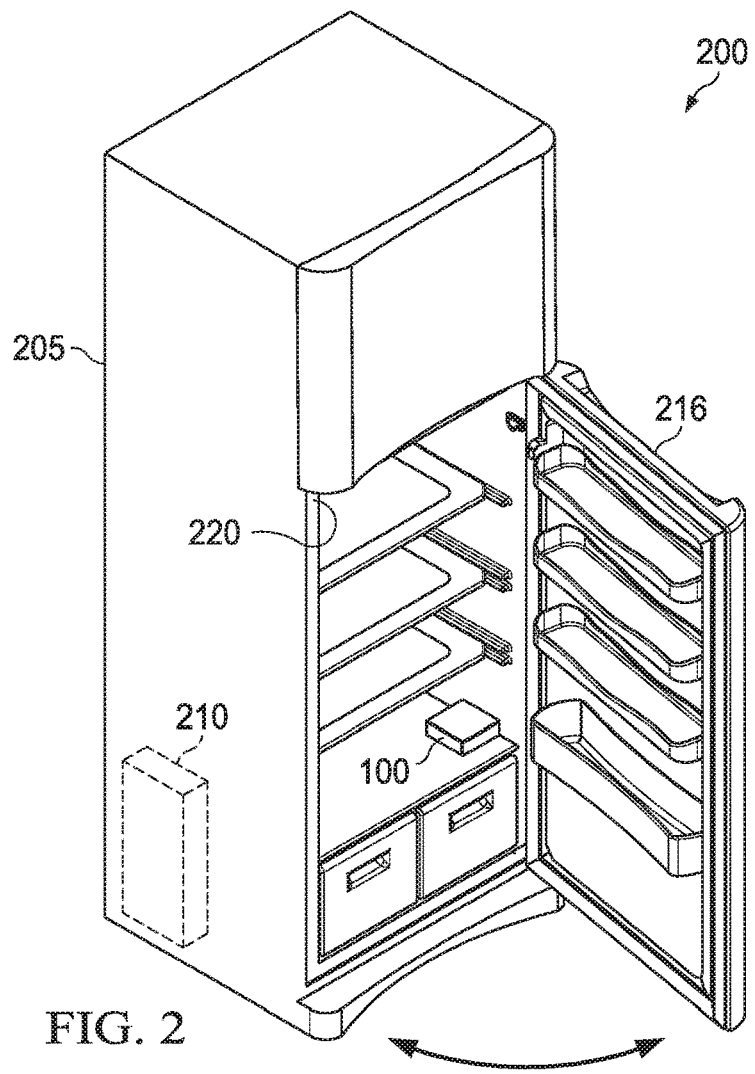
FIG. 2 shows an example of refrigeration unit containing a refrigeration seal monitor.

FIG. 2 shows an example of a refrigeration unit 200. The refrigeration unit includes a chassis 205 and a door 216 hingeably coupled to the chassis. An air chilling component 210 (e.g., a compressor) operates to cool the air inside the chassis. FIG. 2 shows an example of a refrigeration seal monitor 100 placed on a shelf within the refrigeration unit 200. A seal 220 is shown disposed around the interface between the chassis 205 and the door 216. The seal may be attached to the chassis in some embodiments, or to the door in other embodiments. The seal may be made from plastic, rubber or other suitable material.

Figure 3:
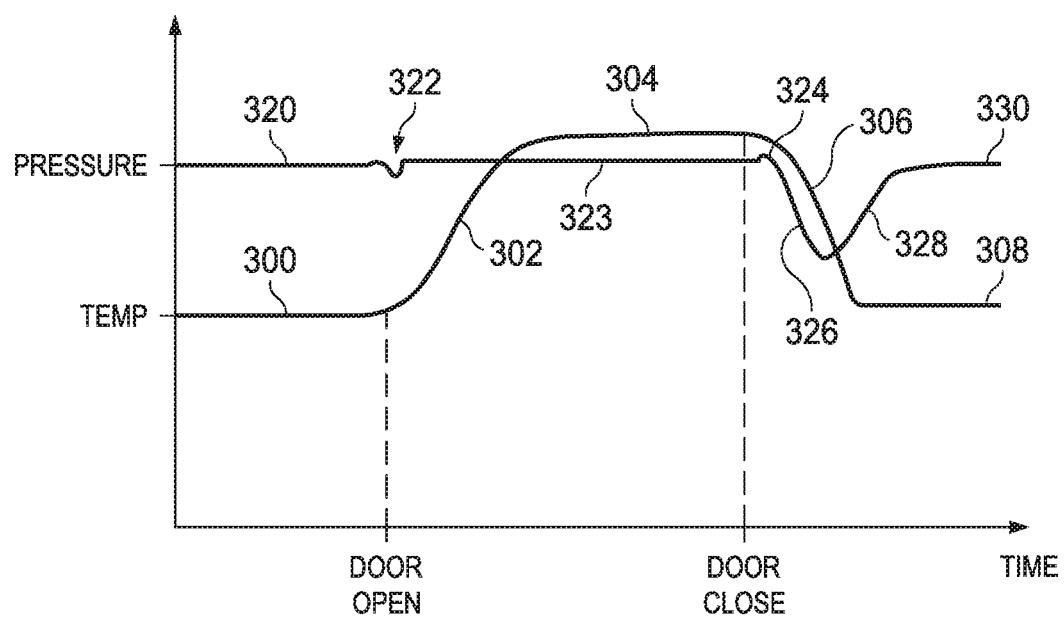
FIG. 3 shows pressure and temperature profiles for a refrigeration unit that has a good seal.

The door 216 of the refrigeration unit 200 can be opened and closed. FIG. 3 shows an example of the temperature and pressure profile as the door is opened and then closed. The temperature profile represents temperature readings received over time by the MCU 110 from the temperature sensor 102. The pressure profile represents pressure readings received over time by the MCU 110 from the pressure sensor 104.

The temperature profile is identified by segments 300, 302, 304, 306, and 308 in the example of FIG. 3. Segment 300 represents the temperature of the air inside the chassis of the refrigeration unit prior to the door being opened and at a steady state. The time line along the X-axis shows a door open event. When the door is opened, warm air rushes into the refrigeration unit and the temperature thereby increases (302). If the door is left open long enough, the temperature may plateau (304). Alternatively, the temperature may keep increasing after the door is opened until the door is subsequently shut. In either case, once the door is closed, the chilling component 210 within the refrigeration unit 200 is activated to begin to cool the air inside the chassis. The downward trend in the air temperature is identified at 306 on the temperature profile. Eventually, the air once again reaches a steady temperature state at 308.

Referring still to FIG. 3, the pressure profile (which of course is on a different scale and unit of measurement than the temperature profile) includes segments 302, 322, 323, 324, 326, 328, and 330. The pressure readings are at a steady level 320 when the door has been shut and the temperature has stabilized. As the door is initially begun to be opened, the pressure readings exhibit a small momentary dip (322) as the volume of the chassis is effectively enlarged slightly with the door opening and relatively few air molecules have had a chance to enter the chassis compartment. Following the dip 322, the pressure again stabilizes at 323 as the warm air enters the chassis. When the door is begun to be closed, the pressure profile will have a small upward bump 324 followed by a decrease (326). The decrease 326 in pressure results from the relationship between pressure and temperature for a given volume. Cooler air molecules have less kinetic energy, move slower and thus experience fewer collisions with each other and with the side walls of the chassis 205. Thus, temperature and pressure are directly related to each other. As the temperature decreases (306), so does the pressure (326).

FIG. 3 shows illustrative temperature and pressure profiles for a refrigeration unit that has a good seal. Even though the seal is acceptable, there are still additional sources of leaks in a refrigeration unit. Consequently, the pressure bottoms out and begins to increase (328) finally returning to a steady state level 330, which approximates the pressure at 320 and 323.

Figure 4:
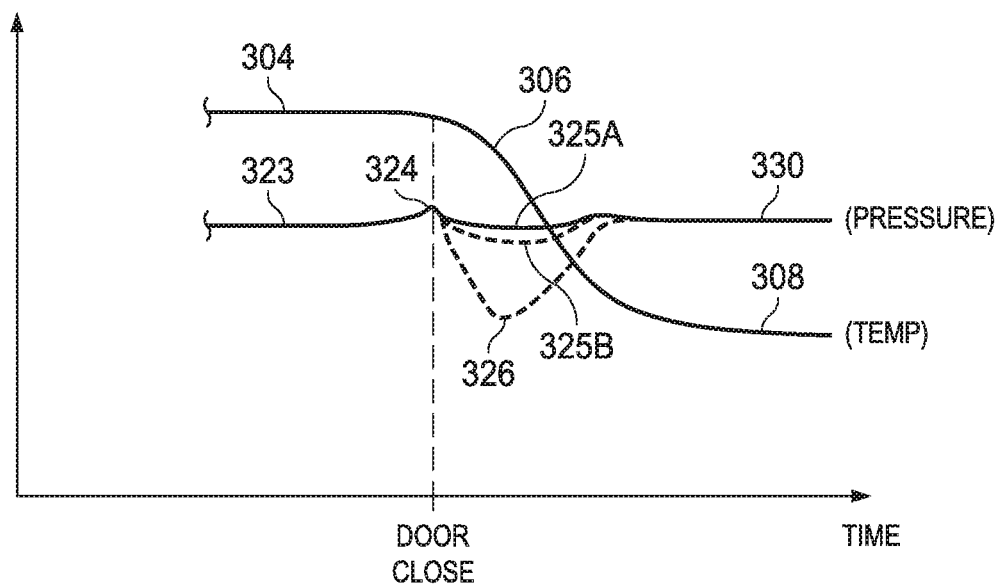
FIG. 4 shows pressure and temperature profiles for a refrigeration unit that has a degraded seal.

FIG. 4 illustrates a portion of the temperature and pressure profiles for a refrigeration unit that has a degraded seal (i.e., one which permits more than acceptable amount of air to enter the chassis even when the door is shut). The temperature profile remains the same, but following the slight bump (324) in pressure as the door is closed, the air pressure decreases (325a) but not as much as would have been the case (dashed segment 326) had the seal not been degraded. In some cases, the drop in pressure following the door closing may be more pronounced as shown by dashed segment 325b, but still not as large as for the case in which the seal is good. The amount of pressure drop following the door closing is a function of the amount of degradation of the seal.

The MCU 110 uses the temperature and pressure readings to determine whether the seal has degraded. In one embodiment, one or more parameters 111 are stored in (or made available to) the MCU 110. The parameters 111 may be calculated by the manufacturer or designer of the refrigeration unit 200 with a seal that is known to be good. The temperature and pressure profiles resulting from opening and closing the door 216 are a function of the internal volume of the chassis, the size (e.g., area) of the door, the size of the chilling component 210, and possibly other factors. Thus, each model of refrigeration unit may have different temperature and pressure profiles. During a controlled test, a temperature sensor and pressure sensor are placed inside the chassis. Once the temperature and pressure have stabilized, the door is opened and the temperature and pressure are continued to be monitored. The door is then shut and the temperature and pressure readings continue to be monitored to thereby characterize he temperature and pressure profile for a particular model refrigeration unit with a known good seal.

The parameters 111 may be derived from the profiles for the good seal. In one example, the temperature readings are correlated to the pressure readings to compute a correlation value. In other example the slopes of the falling segments 306 and 326 can be calculated. Any number of different types of parameters can be calculated based on the profiles recorded with a good seal. The same parameters may be saved to memory for all instances of the same refrigeration unit.

In operation, the MCU 110 of a refrigeration unit uses the parameters 111 and the readings from the temperature and pressure sensors to determine if the seal has degraded. In one embodiment, the MCU detects the occurrence of a door open and then close event to trigger the determination as to whether the seal has degraded. The door open/close event may be detected from monitoring the pressure readings and detecting the slight dip 322 and then increase 324 in pressure (FIG. 3) which coincides with the opening and then closing of the door. In embodiments in which the refrigeration seal monitor is integrated into the refrigeration unit itself, the MCU may detect the door open/close cycle by monitoring a signal from the door sensor (which functions to turn the light on and off inside the chassis).

Once the door open and then close event has been detected, the MCU 110 uses the parameter(s) 111 to determine if the performance of the seal has fallen below a threshold. For example, if the parameter 111 is a correlation value for a known good seal, then the MCU 110 may correlate the live pressure and temperature readings to compute a current correlation value. The MCU 110 may compare the known good correlation value to the current correlation value. In one embodiment, the MCU determines that the seal has degraded if the current correlation value is more than a predetermined threshold percentage different from the known good correlation value. If the parameters 111 include the profiles of temperature and pressure (e.g., their slopes) just after the door has closed, the MCU 110 may compare the current pressure and temperature readings to the known good profiles to detect whether there is more than a threshold deviation from the known good profiles. The MCU may detect a degraded seal by determining whether the rate of change of pressure over time is below a predetermined value.

In some embodiments, the MCU 110 may monitor the change in temperature while monitoring pressure to determine whether a drop in pressure smaller than expected occurs as illustrated at 325b in FIG. 4. The temperature profile may or may not fall as quickly as expected upon shutting the door. For example, if a person places a warm or hot object in the refrigeration unit, the air temperature inside the unit may not fall as quickly as expected, or may even rise in the short term before gradually falling. If this were the case, then the pressure readings would likely not show much, if any, drop in pressure, although the seal is not degraded. Thus, the MCU 110 may monitor the temperature sensor over time to determine whether the readings from the pressure sensor are meaningful or meaningless. If the temperature is not determined to fall as quickly as expected, the MCU 110 may discontinue monitoring the pressure, or ignore the pressure sensor's readings.

In any case, if and when the MCU 110 detects a sufficiently large deviation from the known good profiles (as determined using the previously stored parameters 111 and the current pressure and temperature readings upon a door open/close cycle), the MCU may transmit a signal through the communication interface 116 and/or send a signal to the alert indicator 120.

Figure 5:
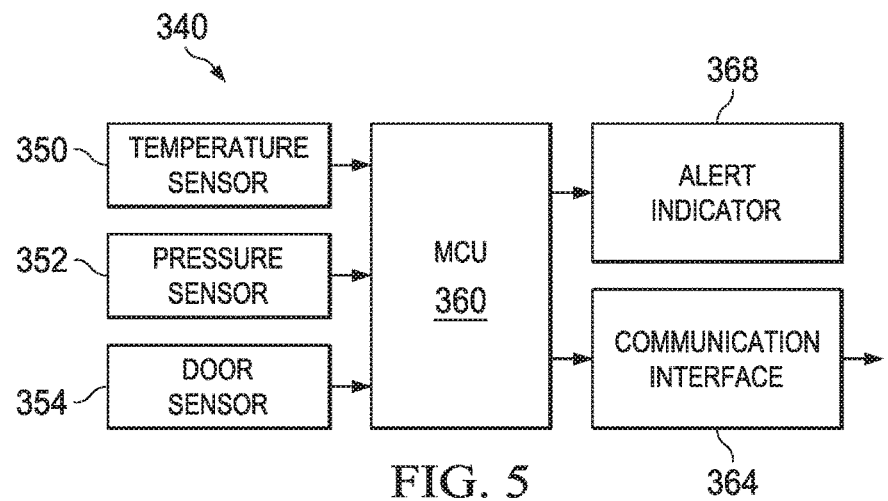
FIG. 5 illustrates another embodiment of a refrigeration seal monitor.

FIG. 5 illustrates another embodiment of the refrigeration seal monitor. The refrigeration seal monitor 340 in this embodiment also includes a temperature sensor 350, pressure sensor 352, MCU 360, communication interface 364, and alert indicator 368. The refrigeration seal monitor 340 of FIG. 5 may be integrated into the refrigeration unit 200 itself. The MCU 360 of the refrigeration seal monitor 340 also may have an interface to receive a signal form a door sensor 354 of the refrigeration unit. The electronics of the refrigeration seal monitor 354 may not be powered by a battery and, instead may have a direct power connection to a power rail or bus within the refrigeration unit.

Figure 6:
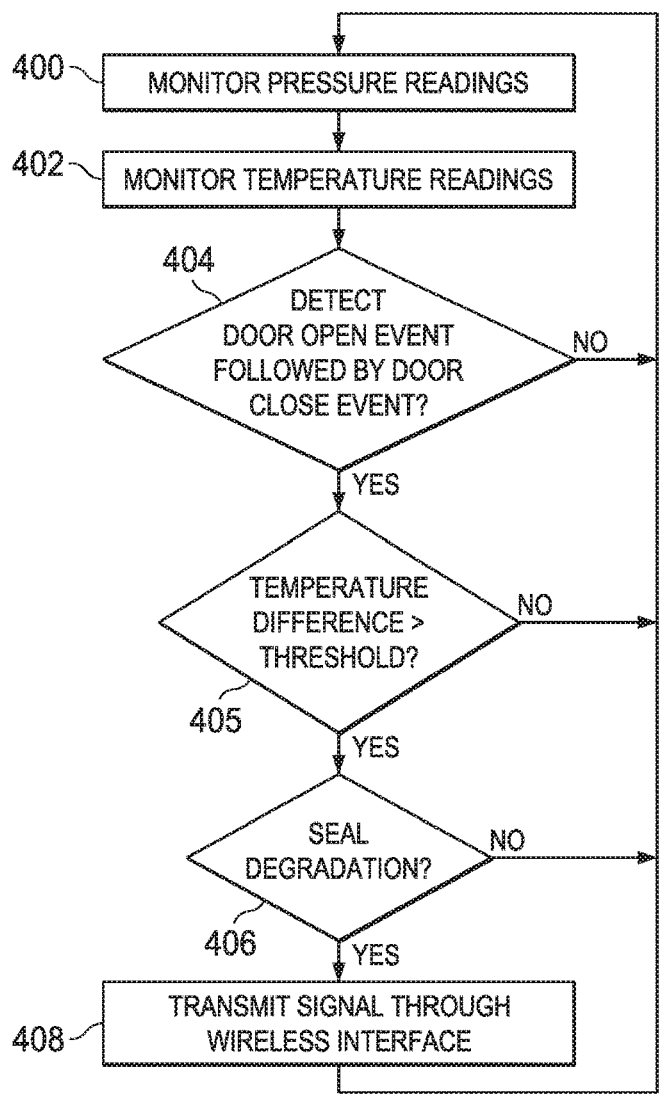
FIG. 6 shows a method in accordance with various embodiments.

FIG. 6 illustrates an example of a method for detecting a failed seal. The operations may be performed in the order shown, or in a different order. Further, the operations may be performed sequentially, or two or more of the operations may be performed concurrently. The operations may be performed by the MCU 110, 360.

At 400, the method includes monitoring pressure readings from a pressure sensor (e.g., pressure sensor 104, 352) in a refrigeration unit. The method further includes at 402 monitoring temperature readings from a temperature sensor (e.g., temperature sensor 102, 350) in the refrigeration unit. At 404, the method includes detecting whether a door of the refrigeration unit has been opened and then closed. In one example, a signal from the door sensor of the refrigeration unit is monitored to detect that the door has opened and then closed. In another embodiment, the momentary drops and increases in pressure can be monitored to detect the door open/close cycle.

Once a door open/close cycle has been detected, the method of FIG. 6 includes determining at 405 whether the temperature difference detected as a result of opening and/or closing the door is greater than a threshold. If the ambient air temperature is approximately the same as the temperature insider the refrigeration unit, there will not be much (or any) pressure change nor much (or any) temperature change. As such, any further processing of the pressure readings to detect a degraded seal may lead to false results (e.g., the seal is detected as defected when it is not, or the seal is defective but the apparatus fails to determine the seal to be degraded). The threshold can be preset or dynamically set as a function of the temperature setting (many refrigeration units have a temperature control). If the temperature difference is determined by the MCU to be less than the threshold, then the method terminates and control loops back to 400. If, however, the temperature difference when the door is opened and/or closed is determined by the MCU to be greater than the threshold, then control continues at 406.

At 406 the MCU determines whether a seal disposed about an interface of the door to a chassis of the refrigeration unit has failed based on the monitored pressure and temperature readings. Examples of how this determination can be made are provided above. Responsive to a determination that the seal has failed, the method then includes at 408 transmitting a signal through a wireless interface (e.g., communication interface 116, 364) to indicate the failure. The alert indicator also can be activated to provide a status indicator. Control loops back to operation 400 and the process repeats.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a temperature sensor;
   a pressure sensor;
   a communication interface; and
   a hardware controller coupled to the temperature sensor, pressure sensor, and communication interface, and coupled to an interface to a door sensor of a refrigeration unit, wherein the hardware controller is configured to:
      monitor temperature readings from the temperature sensor and pressure readings from the pressure sensor;
      determine whether a performance level of a seal around an interface between a door and a chassis of the refrigeration unit has fallen below a threshold level based on the temperature and pressure readings; and
      transmit a signal through the communication interface responsive to a determination that the performance level of the seal has fallen below the threshold level.

2. The apparatus of claim 1, further comprising a battery coupled to the hardware controller and the communication interface.

3. The apparatus of claim 1, wherein the hardware controller is configured to detect a door open and close event of the refrigeration unit based on a signal from the door sensor of the refrigeration unit.

4. The apparatus of claim 1, wherein the hardware controller is configured to detect a door open and close event of the refrigeration unit based on a pressure reading from the pressure sensor.

5. The apparatus of claim 1, wherein the hardware controller is configured to detect a door open and close event based on an increase in temperature as indicated by temperature readings from the temperature sensor.

6. The apparatus of claim 1, further comprising memory containing a parameter that is used by the hardware controller to determine whether the performance level of the seal has fallen below the threshold level.

7. The apparatus of claim 6, wherein the memory includes a plurality of parameters, and the parameters comprises a value indicative of a rate of change of pressure and a value indicative of a rate of change of temperature.

8. The apparatus of claim 1, wherein the hardware controller is configured to determine that the performance level of the seal has fallen below a threshold level based on computation of a correlation between the pressure readings and the temperature readings and determining that the correlation is below a correlation threshold.

9. The apparatus of claim 1, wherein the hardware controller is configured to determine that the performance level of the seal has fallen below a threshold level based on a determination that the rate of change of pressure over time is below a predetermined value.

10. The apparatus of claim 1, further comprising an alert indicator coupled to the hardware controller, wherein the hardware controller generates a signal to the alert indicator responsive to the determination that the performance level of the seal has fallen below a threshold level.

11. The apparatus of claim 1, further comprising a unitary package containing the temperature sensor, the pressure sensor, the communication interface, and the hardware controller.

12. An apparatus, comprising:
    an air chilling component to chill air inside a chassis, the chassis having a hingeably connected door and a seal disposed around an interface between the chassis and the door;
    a temperature sensor inside the chassis;
    a pressure sensor inside the chassis; and
    a hardware controller coupled to the temperature sensor and pressure sensor, and coupled to an interface to a door sensor that detects the door opening or closing, wherein the hardware controller is configured to:
       receive temperature readings from the temperature sensor and pressure readings from the pressure sensor; and
       determine whether a performance level of the seal has fallen below a threshold level based on the temperature and pressure readings.

13. The apparatus of claim 12, wherein the hardware controller is configured to detect a door open and close event and, responsive to the detected door open and close event, to determine whether the performance level of the seal has fallen below the threshold level.

14. The apparatus of claim 13, wherein the hardware controller is configured to detect the door open and close event based on an increase in temperature as indicated by temperature readings from the temperature sensor.

15. The apparatus of claim 12, wherein the hardware controller is configured to determine that the performance level of the seal has fallen below a threshold level based on computation of a correlation between the pressure readings and the temperature readings and determining that the correlation is below a correlation threshold.

16. The apparatus of claim 12, further comprising a communication interface coupled to the hardware controller, wherein the hardware controller is configured to transmit a signal through the communication interface responsive to a determination that the performance level of the seal has fallen below the threshold level.

17. A method, comprising:
monitoring pressure readings from a pressure sensor in a refrigeration unit;
monitoring temperature readings from a temperature sensor in the refrigeration unit;
detecting that a door of the refrigeration unit has been opened and then closed;
determining whether a seal disposed about an interface of the door to a chassis of the refrigeration unit has failed based on the monitored pressure and temperature readings; and
responsive to a determination that the seal has failed, transmitting a signal through a wireless interface to indicate the failure.

18. The method of claim 17, wherein detecting that the door has opened comprises detecting a temporary drop in pressure of the pressure readings.

19. The method of claim 17, wherein determining whether the seal disposed has failed comprises computing a correlation value of the temperature readings to the pressure readings.

\* \* \* \* \*